United States Patent
Clark et al.

(10) Patent No.: US 9,003,106 B1
(45) Date of Patent: Apr. 7, 2015

(54) CRASH CONSISTENCY

(71) Applicant: EMC Corporation, Hopkinton, MA (US)

(72) Inventors: Roy E Clark, Hopkinton, MA (US); John S Harwood, Paxton, MA (US); David Cohen, Hull, MA (US)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 13/803,840

(22) Filed: Mar. 14, 2013

Related U.S. Application Data

(63) Continuation-in-part of application No. 13/684,953, filed on Nov. 26, 2012.

(51) Int. Cl.
G06F 12/02 (2006.01)
G06F 12/14 (2006.01)

(52) U.S. Cl.
CPC ........ G06F 12/1416 (2013.01); G06F 12/0246 (2013.01)

(58) Field of Classification Search
CPC .................................................. G06F 12/0246
See application file for complete search history.

(56) References Cited

U.S. PATENT DOCUMENTS

| | | | |
|---|---|---|---|
| 5,403,639 A * | 4/1995 | Belsan et al. ........................ 1/1 |
| 7,882,071 B2 * | 2/2011 | Fachan et al. ................. 707/649 |
| 8,495,017 B2 * | 7/2013 | Lafont et al. .................. 707/634 |
| 2003/0131253 A1 * | 7/2003 | Martin et al. ................. 713/200 |
| 2007/0185938 A1 * | 8/2007 | Prahlad et al. ................ 707/204 |
| 2008/0288811 A1 * | 11/2008 | Sudhakar .......................... 714/4 |
| 2010/0106813 A1 * | 4/2010 | Voutilainen et al. .......... 709/221 |
| 2010/0179959 A1 * | 7/2010 | Shoens ......................... 707/758 |

* cited by examiner

*Primary Examiner* — Hiep Nguyen
(74) *Attorney, Agent, or Firm* — Krishnendu Gupta; Joseph D'Angelo

(57) ABSTRACT

A system, method, and computer program product for establishing a memory-mapped file, enabling the memory-mapped file data to be paged to a non-volatile storage medium, marking a portion of the memory-mapped file as protected, wherein a write to the memory mapped file throws a segmentation fault; receiving a write at the memory mapped file, throwing a segmentation fault; and handling the segmentation fault in a segmentation handler, where the handling comprises reading the information in the memory mapped file facility into the undo log, and writing the write IO to the storage medium.

15 Claims, 26 Drawing Sheets

CRASH CONSISTENCY

RELATED APPLICATIONS AND PRIORITY CLAIM

This Application is a Continuation-in-Part of U.S. patent application Ser. No. 13/684,953 entitled "CRASH CONSISTENCY" filed on Nov. 26, 2012, the contents and teachings of which are incorporated herein by reference in their entirety.

This Application is related to U.S. patent application Ser. No. 13/798,395 entitled "CRASH CONSISTENCY", filed on even date herewith, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost and density of memory is such that organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

SUMMARY

A system, method, and computer program product for establishing a memory-mapped file, enabling the memory-mapped file data to be paged to a non-volatile storage medium, marking a portion of the memory-mapped file as protected, wherein a write to the memory mapped file throws a segmentation fault; receiving a write at the memory mapped file, throwing a segmentation fault; and handling the segmentation fault in a segmentation handler, where the handling comprises reading the information in the memory mapped file facility into the undo log, and writing the write IO to the storage medium.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
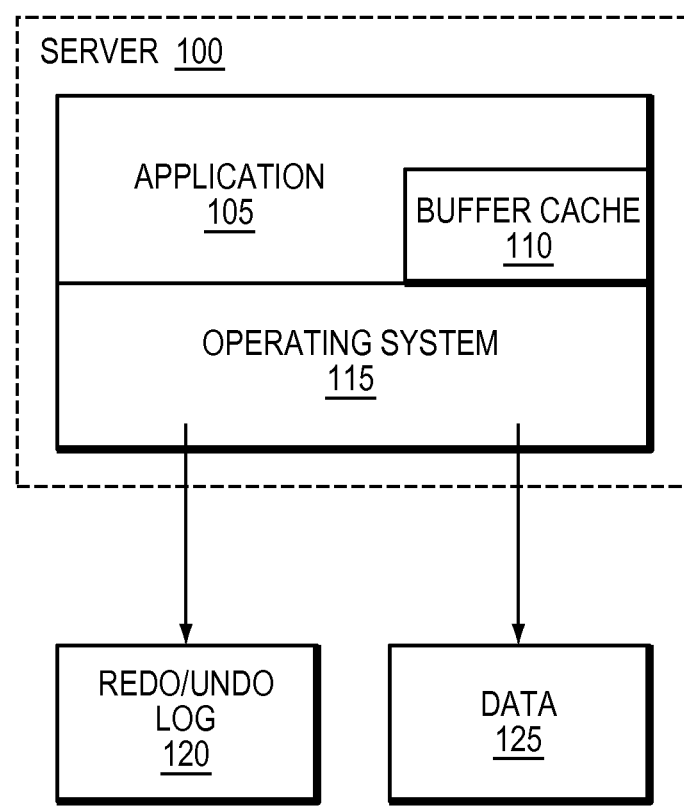
FIG. 1 is a simplified illustration of an application with a buffer cache communicating with an operating system, in accordance with an embodiment of the present disclosure.

Maintaining a crash consistent view of volatile memory containing application data structures is typically done through a persistence layer using undo/redo logging. Conventionally, applications create transactional consistency boundaries by writing log entries that are persisted on storage before new data is written to a structure(s). Generally, upon a server crash/reboot these logs are replayed against a previous checkpoint to reconstruct a consistent view of all data structures at a consistency boundary just prior to the time of the crash.

Conventionally, an undo log may be used to bring the image back to a particular point in time and the redo log may then be applied to that image. Typically, this eliminates an exposure of losing dirty data contained in volatile memory. Conventional memory techniques for greatly expanding the effective size of volatile memory, such as a memory mapped files may be available to a typical database. However, generally the database may have no visibility to how the memory mapped file is maintained and whether, following a crash, a consistent image is available. Typically, the database continues to use a combination of undo and redo logs as described herein.

In some embodiments, the current disclosure may enable utilizing an operating system memory mapped file facility, a non-volatile flash storage medium and a service exposed to an application which manages and creates persistent, crash consistent checkpoints of a memory-mapped file. In certain embodiments, a service or device may manage undo logging at runtime and undo replay at restart or reboot time. In at least some embodiments, an application may maintain a redo log to be applied to the checkpoint. In most embodiments, the current disclosure may enable a crash-consistent non-volatile address space to be made available to an application. In certain embodiments, an application may not need to manage a buffer cache. In further embodiments, an application may manage a redo log and a device or service may transparently manage the undo log. In at least some embodiments, the storage domain may be mapped into the load/store memory domain. In some embodiments, the memory of the server may be extended through the use of flash. In further embodiments, memory extended to flash or another nonvolatile storage medium may be used to create crash-consistent storage.

In certain embodiments, writes may be persisted through the use of a free list and log structure. In an embodiment, the log structure may keep track of the location of written data and redirect overwrites to this data to other locations. In most embodiments the structure may maintain a list of the original and subsequent written data to enable the data to be rolled back to a previous point in time. In some embodiments, the structure may be stored on a persistent storage medium such as flash storage. In certain embodiments, each write and overwrite to a data location may be tracked by the structure. In other embodiments, the first write and last overwrite to a data location may be tracked. In most embodiments, the structure may be stored in persistent memory, such as a flash device.

In certain embodiments, writes to a particular memory space may trigger a page fault. In some embodiments, a page fault handler may send the current data to an undo log before overwriting with new data. In further embodiments, the data in the page fault may be recorded to an undo log before the new data is written to the device. In some embodiments, a structure may be used in combination with a segmentation fault handler The following terms may be useful in understanding one or more embodiments presented herein:

MMAP—may stand for a memory-mapped file. A memory-mapped file may be a segment of virtual memory which has been assigned a direct byte-for-byte correlation with some portion of a file or file-like resource. Typically, this resource may be a file that is physically present on a non-volatile storage medium. A correlation between the file and the memory space may permit applications to treat the mapped portion as if it were primary memory. Mmap is generally a method of memory-mapped file I/O. Conventionally, it relies on demand paging, because initially file contents may not be entirely read from disk into physical RAM. Generally, the actual reads from disk are performed in an ondemand manner, after a specific location is accessed. Using conventional techniques, if a memory-mapped file crashes, there may be no way to know whether or not the memory-mapped file is consistent because dirty portions may not have been written to the file on storage. Thus, following a typical crash, a conventional memory-mapped file may not provide a consistent image for an application.

DIRTY PAGES—may be memory pages in a buffer or page cache that have been modified and need to be written back to a storage device BUFFER CACHE—may be a cache of application data including clean and dirty pages maintained by the application PAGE CACHE—may be a cache of pages including clean and dirty pages that the OS maintains which are copies of data located on a storage device LOG SYNC—may be a point in time where an application desires to create a point in time from where data can be recovered to a consistent state representing this point in time if needed MSYNC—may refer to a method for synchronizing the in-memory image of a file with the file content on-disk by writing out the dirty pages to storage.

LPO—may refer to logical page offset. An LPO may be a 4 KB-aligned offset into an mmped file.

SMT—may refer to SSD Map table which maps an LPO to a PPO.

PPO—may refer to physical page offset. A PPO may be a 4 KB-aligned offset into a SSD device.

FL—may refer to a free list. A free list may be a structure that tracks the PPO of a current piece of data for an LPO and the PPO of a previous piece of data for that LPO. In certain embodiments, a free list may track the data associated with an LPO for a plurality of writes for that location (i.e. keeps track of the data that was overwritten for a given number of writes to that logical location.

Page Fault—a page fault may be a trap or notification sent to a software handler when the hardware of a system tries to access a page that is mapped to a virtual address space, where that address space may not be mapped and/or whose data may not currently be residing in physical memory.

Segmentation fault—may be referred to herein as segv, and may signify an attempt to access memory by either a write and/or read where the memory has been protected by the operating system or that a CPU of a computer system or the memory may not be able to physically addressed. In some embodiments, if a segmentation fault is not handled, it may cause an error or access violation. In other embodiments, a segmentation fault handler may provide a way to handle the segmentation fault. In most embodiments, a segmentation fault may be defined by a user or operating system. In certain embodiments, a particular segmentation fault may be sent to a particular segmentation fault handler. In most embodiments, a segmentation fault handler may handle the segmentation fault without an error.

IOCTL—(generally refers to an abbreviation of input/output control) may be a system call for device-specific input/output operations and other operations which may not be expressed by regular system calls. An ioctl may be used to tell a log device to discard log entries and start over. This instruction may be communicated in a variety of ways, of which Ioctl is an example.

PAGING may be a memory-management scheme where a computer may store and retrieve data from secondary storage for use in main memory. Typically, in some paging memory-management schemes, the operating system may retrieve data from secondary storage in same-size blocks called pages so that the physical address space of a process may not need to be contiguous. Conventionally, paging may be an implementation of virtual memory enabling the use of disk or other non-volatile storage for data that does not fit into volatile storage. Generally, paging-in of pages may occur when a program tries to access a page not in RAM; conventionally, this is called a page fault and the OS may determine the location of the data in auxiliary storage and load the data into a page in RAM. Usually, the page may be put in an empty slot or non-empty slot. If the data in that slot has been modified since it was read into RAM (i.e., if it had become "dirty"), it may be written back, or paged-out to its location in secondary storage before being freed.

In certain embodiments, the current disclosure may enable a methodology to assist a redo log and may facilitate a new type of storage device and Operating System (OS) interaction. In certain embodiments, an OS may push dirty pages to storage. In some embodiments, dirty pages may be intercepted and used to create an undo log. In at least some embodiments, an undo log may save information and enable an image to be reconstructed to create memory at an earlier point in time. In most embodiments, a database or application may create a checkpoint. In certain embodiments, a database or application may maintain a redo log.

In certain embodiments, the current disclosure may extend RAM type memory capacity of a server by mapping that capacity to a flash device. In some embodiments, a memory-mapped file may be a method to extend the memory capacity of a server. In a particular embodiment, a memory-mapped file may enable a terabyte of flash memory to be mapped into a database application space. In certain embodiments, load and store accesses that an application believes is going to memory may be indirectly going to and from flash. In most embodiments, an OS may be handling paging data from a flash device into RAM memory. In certain embodiments, a file on a local PCIE flash device or SSD device, or on a array disk, but cached through the PCIE flash device, may be memory mapped. In certain embodiments, as memory mapping conventionally engages a demand paging system in an OS, the effective size of primary memory as seen by an application may be larger than the available DRAM in the system. Generally, with a memory mapped file, an operating system handles paging the virtual memory space.

For example, refer to the example embodiment of FIG. 1. In the example embodiment of FIG. 1, application 105 is running on server 100 and has buffer cache 110. Application 105 is interacting with operating system 115 to perform IO. Operating system 115 writes data to redo/undo log 120 and writes data to data 125 as requested by application 115.

Figure 2:
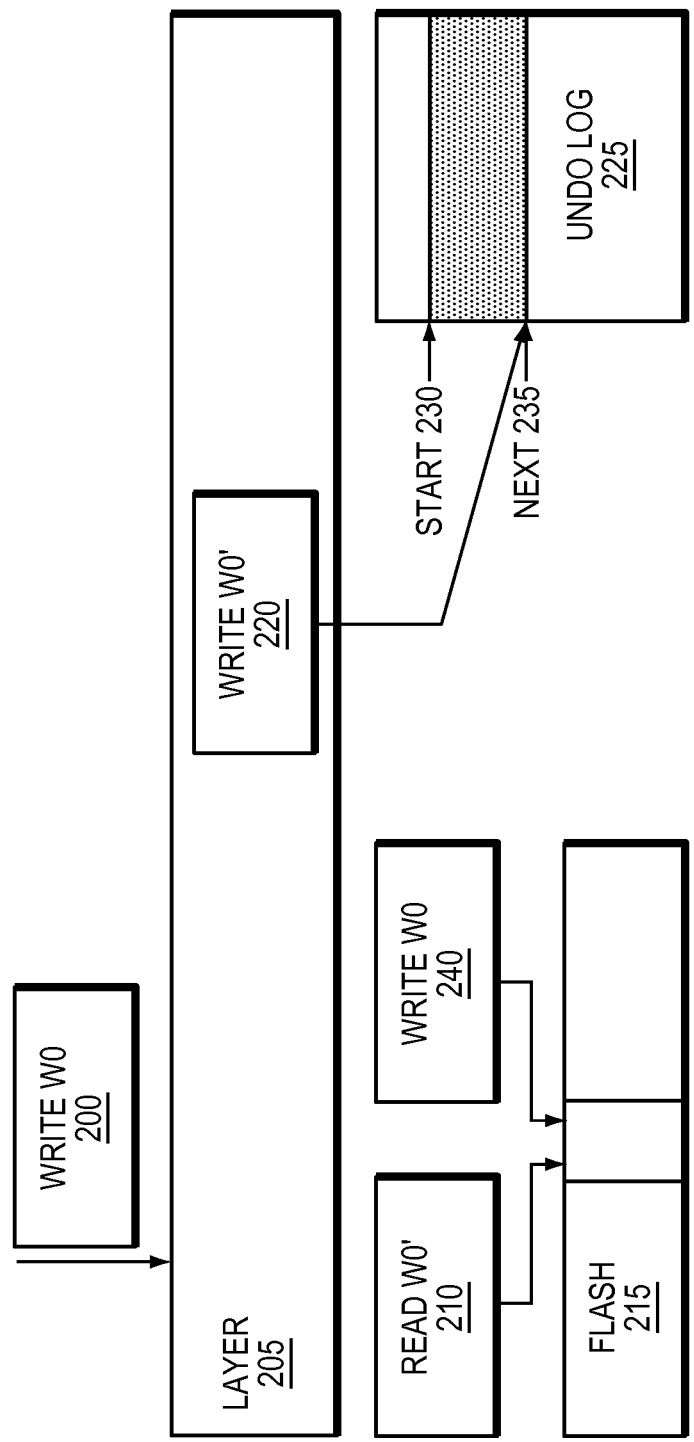
FIG. 2 is a simplified illustration of a device performing a logging function in response to receiving a write command, in accordance with an embodiment of the present disclosure.
Figure 3:
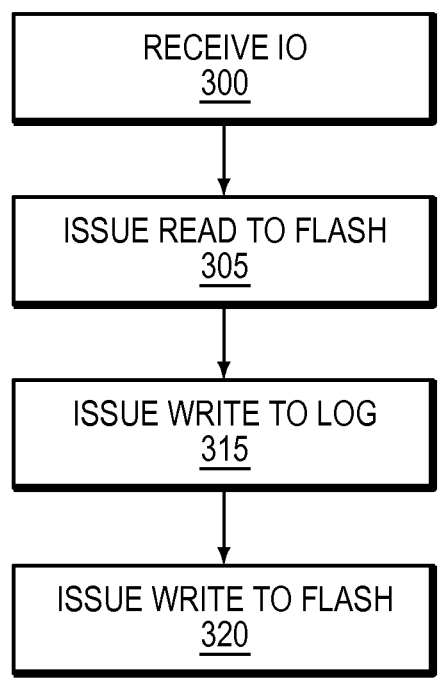
FIG. 3 is a simplified example of a method for responding to an IO received at a device, in accordance with an embodiment of the present disclosure.

Refer now to the example embodiments of FIGS. 2 and 3, Layer 205 receives write W0 200 (step 300). Layer 205 issues Read W0' 210 to flash 215 (step 305). Read W0' 210 corresponds to the point in Flash 215 that Write W0 200 is to overwrite. Layer 205 writes Write W0' 220 (step 315), which corresponds to the data of Read W0' 210, to Undo log 225. Undo Log 225 has a start 230 and a next 235. Start 230 corresponds to the start of the undo log since a last checkpoint was taken. Next 235 corresponds to where the next write should occur in undo log 225. Following write W0' 220 in undo log 225, the next 235 may be advanced. Layer 205 writes Write W0 240 to flash 215 (step 320). In some embodiments a layer, such as layer 205, may be connected to the undo log (225) via a fiber channel or ISCI connection. In other embodiments a layer, such as layer 205, may be connected to flash (215) via local PCIE to a flash card, a local SSD, a fiber channel or ISCI connection. In some further embodiments a layer, such as layer 205, may be connected to flash (215) and undo log (225) as exposed through a local caching device.

In most embodiments, a layer, such as layer 205, may wait for acknowledgement that a read W0' 210, Write W0' 220 and Write W0 240 has completed before executing another write W0 200. In at least some embodiments, waiting for an acknowledgement may ensure data consistency.

Figure 4:
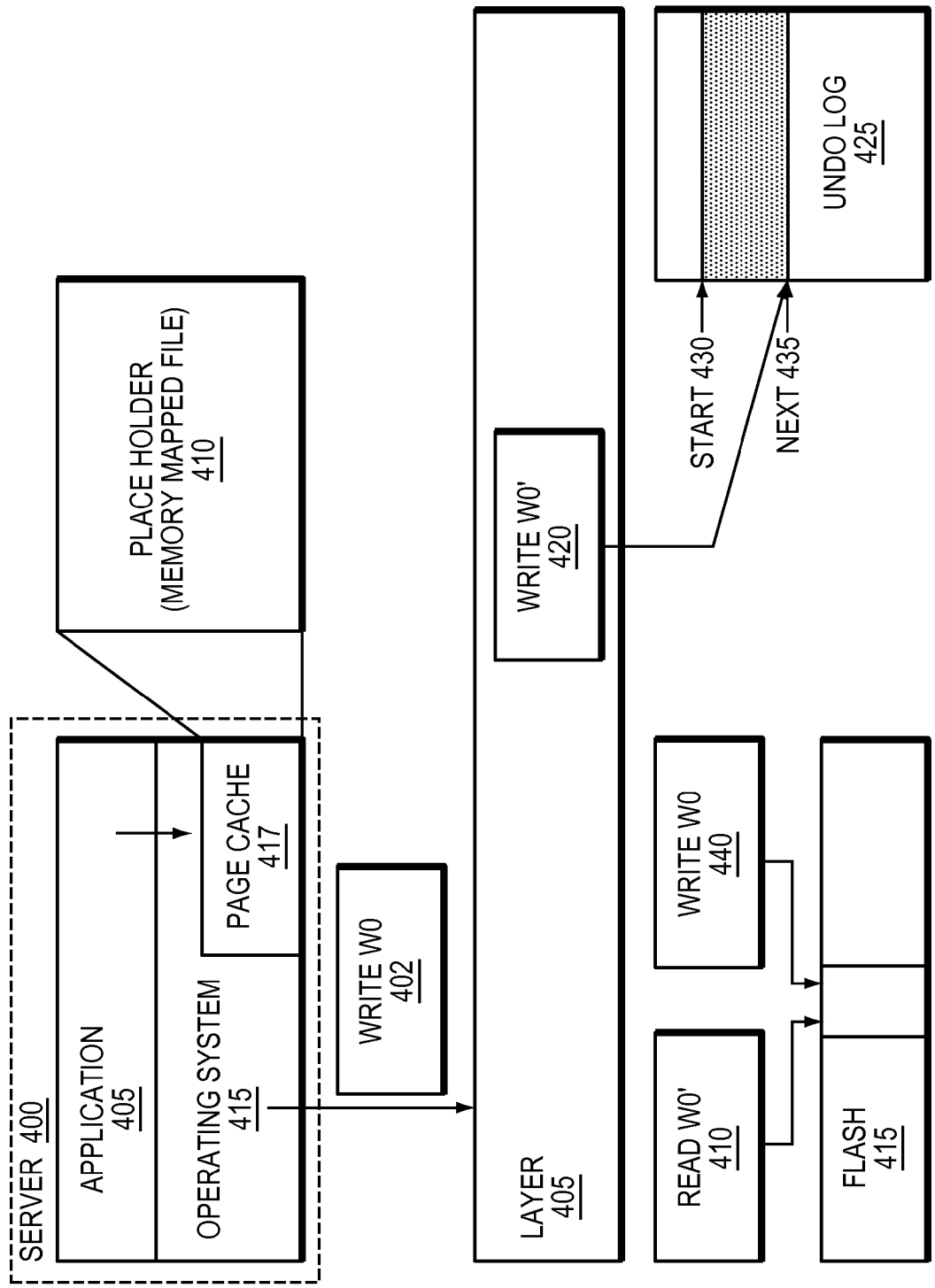
FIG. 4 is a simplified illustration of an application writing information to a memory mapped file and a device responding to IO, in accordance with an embodiment of the present disclosure.
Figure 5:
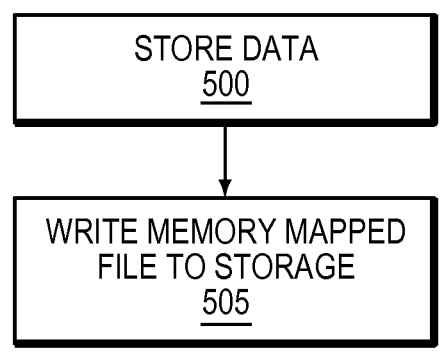
FIG. 5 is a simplified example of a method for writing data to a memory mapped file to storage, in accordance with an embodiment of the present disclosure.

For example, refer to the example embodiments of FIGS. 4 and 5. In the example embodiment of FIG. 4, application 405 is running on server 400. Application 405 is storing data, within Place holder 410, in this embodiment a memory mapped file (step 500). In this embodiment, the Operating system 415 handles paging to and from the virtual memory space or placeholder 410 into physical memory containing the page cache (417). Placeholder 410 is in turn mapped to flash 415 via operating system 415. Operating system 415 has page cache 417 and occasionally writes IO, such as Write W0 402, from page cache (417) to layer 405 (step 505). Layer 405 appears to operating system 415 as a storage device, which in some embodiments may be a flash card. Application 405 may not need a buffer cache.

Layer 405 receives write W0 402. Layer 405 issues Read W0' 410 to flash 415. Read W0' 410 corresponds to the point in Flash 415 that Write W0 402 is to overwrite. Layer 405 writes Write W0' 420, which corresponds to the data of Read W0' 410, to Undo log 425. Undo Log 425 has a start 430 and a next 435. Start 430 corresponds to the start of the undo log since a last checkpoint was taken. Next 435 corresponds to where the next write should occur in undo log 425. Following write W0' 420 in undo log 425, the next 435 may be advanced. Layer 405 writes Write W0 440 to flash 415.

Figure 6:
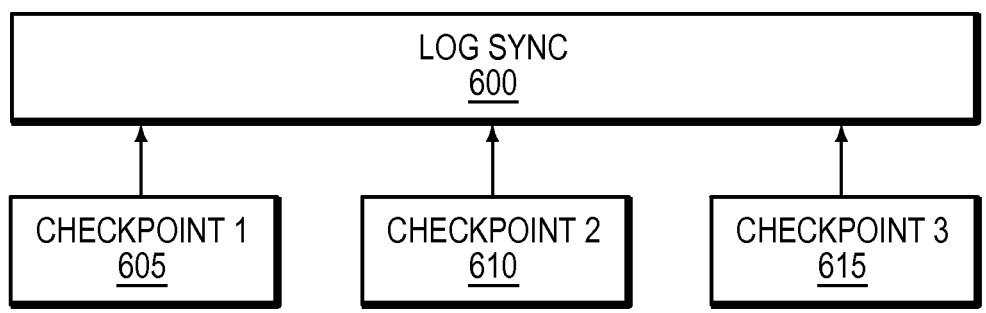
FIG. 6 is a simplified illustration of a series of checkpoints in an undo log, in accordance with an embodiment of the present disclosure.
Figure 7:
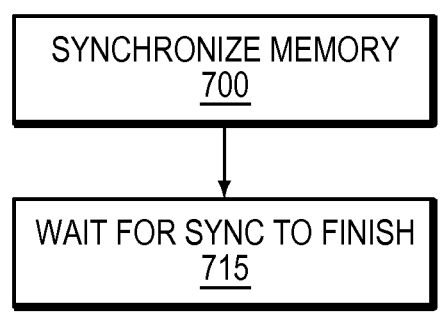
FIG. 7 is a simplified example of a method for synchronizing memory, in accordance with an embodiment of the present disclosure.

Refer now to the example embodiments of FIGS. 6 and 7. FIG. 6 illustrates and example log synchronization 600. Log Sync 600 has checkpoints 1 605, checkpoint 2 610, and checkpoint 3 616. A synchronize memory command occurs (step 700), which writes dirty pages from page cache (417) to storage. In certain embodiments the synchronization may occur through the use of a msync command. The system waits for the synchronization to finish (step 715), which indicates that all the dirty pages in memory has been written to the storage. In this embodiment, once the writing has finished, a new consistent checkpoint may be created.

In most embodiments, when a checkpoint occurs, an OS may take old dirty pages that have been modified and may write them out to what the OS thinks is a memory mapped file. In some embodiments, after issuing a msync, an ioltc may be issued to determine that an OS has written all the information and the undo log (425) has been initialized. In certain embodiments, after the ioltc comes back completed, a database may have created a checkpoint and everything may have been written to the flash.

Figure 8:
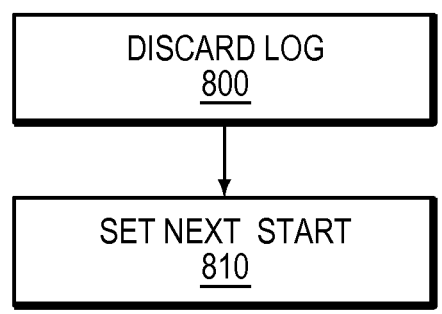
FIG. 8 is a simplified example of a method for starting a new log checkpoint, in accordance with an embodiment of the present disclosure.

Refer now to the example embodiments of FIGS. 4 and 8. In the embodiment, the old log 425 may be discarded (step 800). A new log start may be indicated by moving start 430 to next 435 of undo log 425 (step 810).

Figure 9:
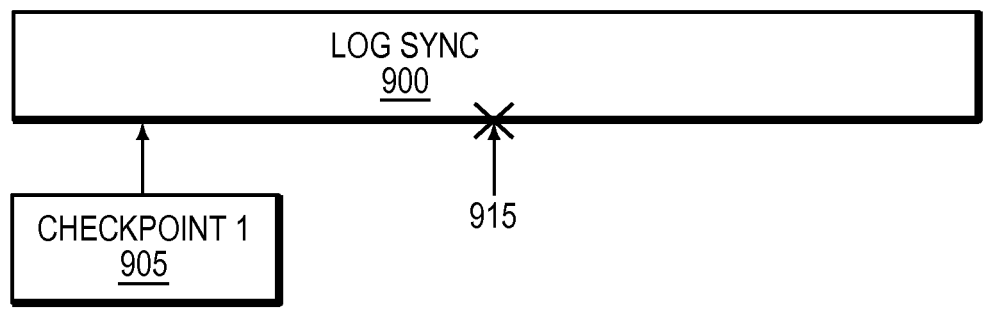
FIG. 9 is a simplified illustration of a crash after checkpoint in an undo log, in accordance with an embodiment of the present disclosure.
Figure 10:
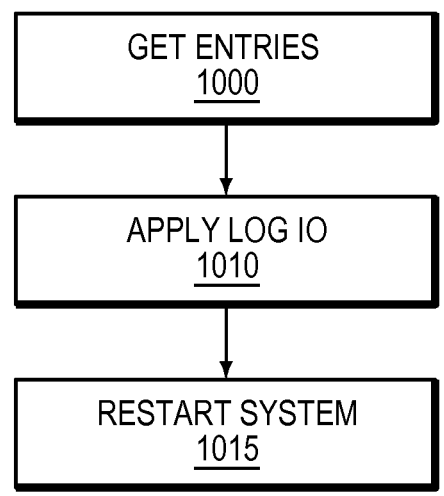
FIG. 10 is a simplified example of a method for rolling back to a checkpoint by applying TO in an undo log, in accordance with an embodiment of the present disclosure.

Refer now to the example embodiments of FIGS. 9 and 10. In the example embodiment of FIG. 9, checkpoint 1 905 exists in log synch 900. At point in time 915, a crash occurs. To point in time 915, data has been written to a log, such as undo log 425 of FIG. 4. To roll the image back to a consistent point in time, log entries entered since checkpoint 905 is used (step 1000). TO is applied from the log synchronization (step 1010). The system is restarted with the revised image (step 1015).

Figure 11:
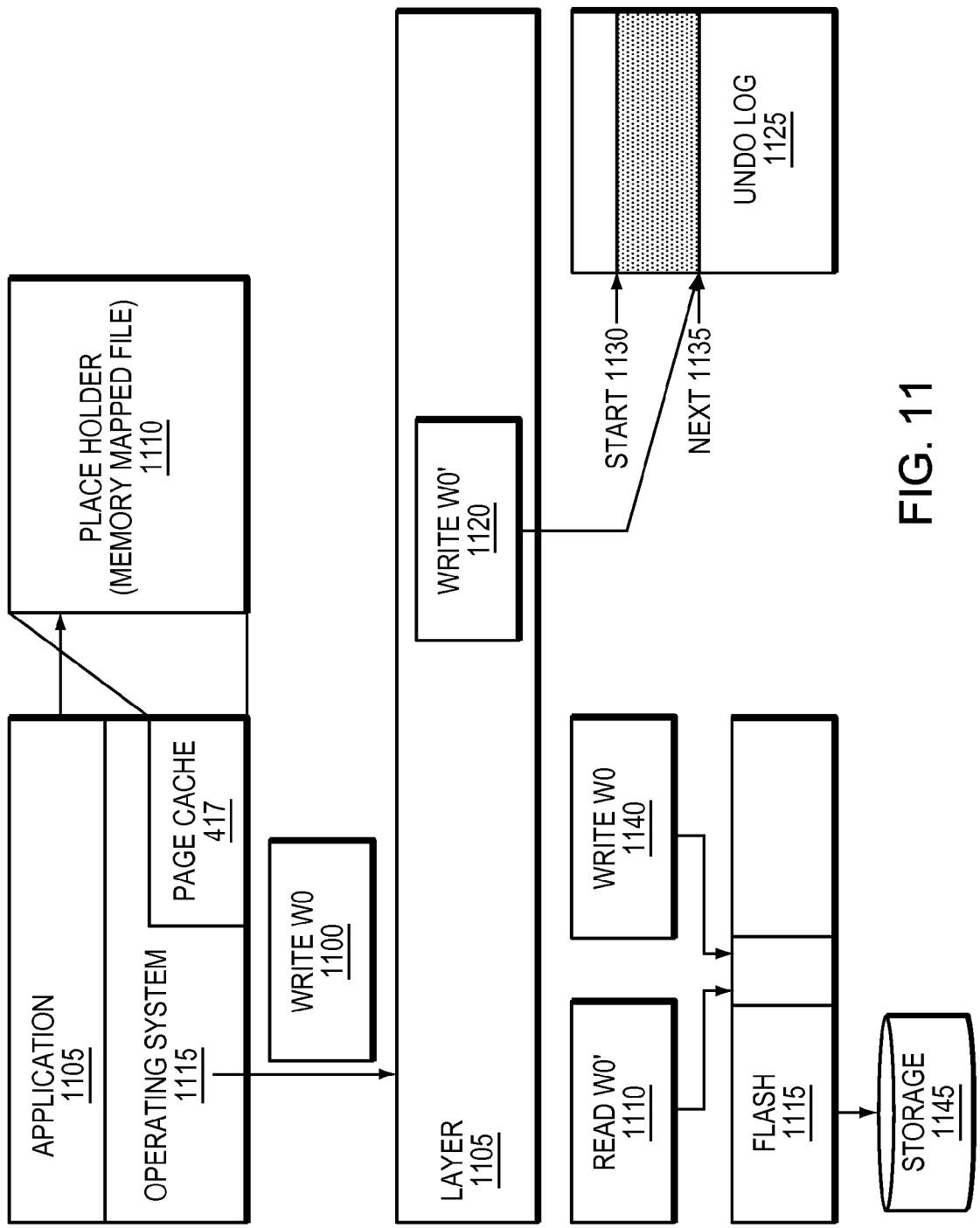
FIG. 11 is a simplified illustration of an application writing information to a memory mapped file and a device responding to IO, where that IO is written to flash and transferred to storage, in accordance with an embodiment of the present disclosure.
Figure 12:
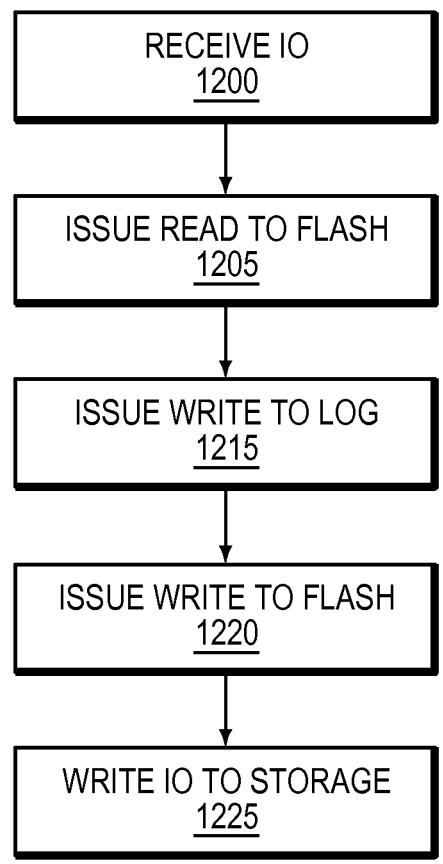
FIG. 12 is a simplified example of a method for writing IO to storage, in accordance with an embodiment of the present disclosure.

Refer now to the example embodiments of FIGS. 11 and 12. Layer 1105 receives write W0 1100 (step 1200). Layer 1105 issues read W0' 1110 to flash 1115 (step 1205). Layer 1105 issues write W0' 1120 to Undo log 1125 (step 1215).

Layer 1105 issues write W0 1140 to flash 1115 (step 1220). Write W0 1140 is written from flash 1115 to storage 1145 (step 1225).

Write Changes Using Undo Logging Device

Figure 13:
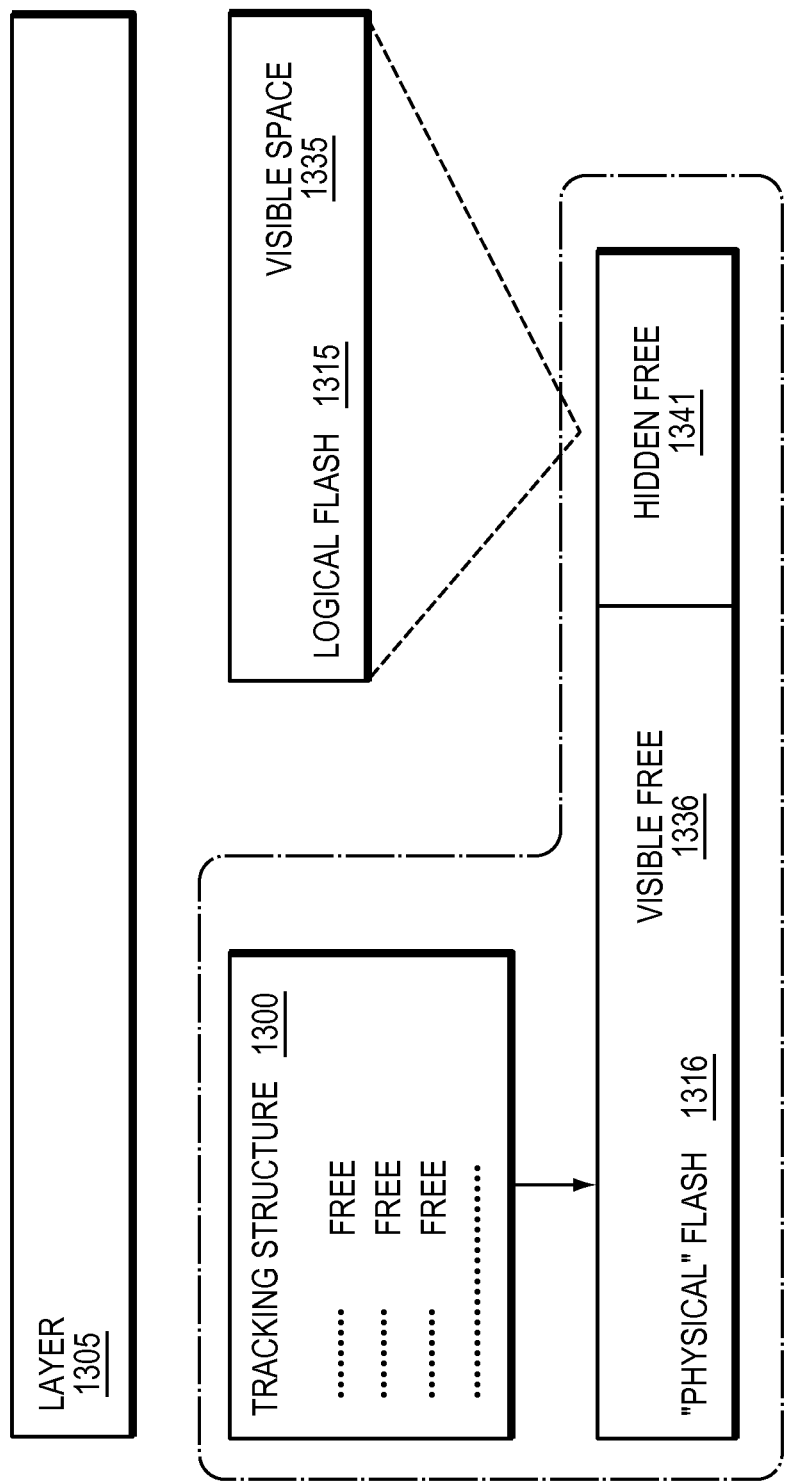
FIG. 13 is a simplified illustration of a layer, tracking structure, physical storage, and a logical view of the physical storage, in accordance with an embodiment of the present disclosure.

Refer now to the example embodiment of FIG. 13, which represents an alternative simplified embodiment for recording write changes. In this embodiment, there are two views of the flash, a logical flash 1315 view and a physical flash 1316 view. In this embodiment, tracking structure 1300 and physical flash 1316, may enable the view of the flash presented by logical flash 1315. In this embodiment, logical flash 1315 has visible space 1335. Visible space 1335 represents space that may be written to by the operating system. Physical flash 1316 has visible free 1336 and hidden free 1341.

Tracking structure 1300 represents a structure that records whether or not there has been a write or an overwrite to visible space 1335. In the example embodiment of FIG. 13, there have been no writes to visible space and tracking structure 1300 has not marked any changes. In this embodiment, the view of the flash of logical flash 1315 is similar to the view presented by physical flash 1316. In this embodiment, as writes occur to visible space 1335 on logical flash 1315, they will be marked on tracking structure 1300. If a write is to overwrite the information in visible space 1335 on logical flash, the write will occur in hidden free space 1341 on physical flash 1316 and tracking structure 1300 will contain a reference such as a pointer or PPO to the "overwritten" information in hidden free 1341, as well as a reference to the original information in the visible free 1336.

Figure 14:
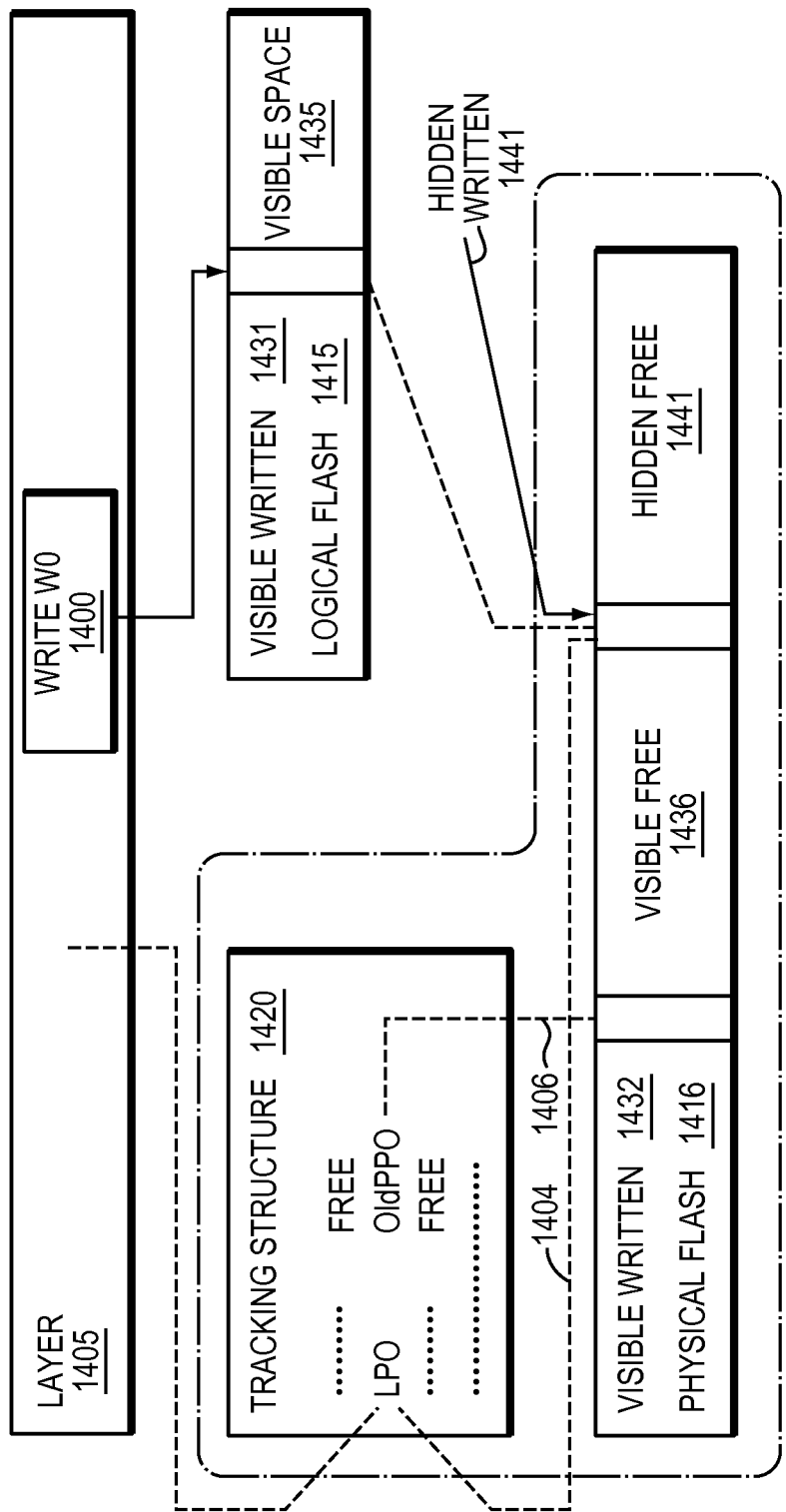
FIG. 14 is a simplified illustration of a device performing write to a logical view of a storage medium, where both the write data and the previous data are stored using a tracking structure and a physical storage medium with visible and hidden storage space, in accordance with an embodiment of the present disclosure.
Figure 15:
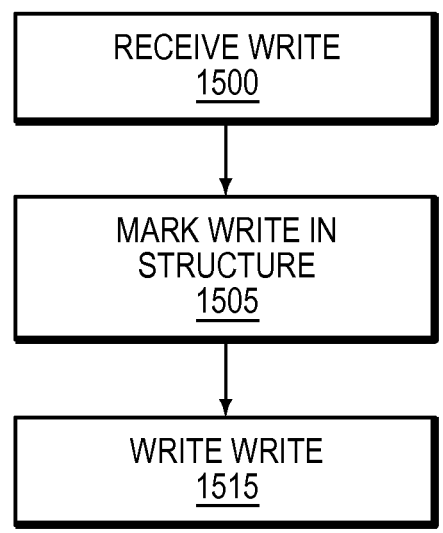
FIG. 15 is a simplified example of a method for writing IO to storage while keeping both the original and written data in storage, in accordance with an embodiment of the present disclosure.

Refer now to the example embodiments of FIGS. 14 and 15. FIGS. 14 and 15 illustrate the process of a write occurring on logical flash 1415 and how the write occurs on physical flash 1416. Write W0 1400 reaches layer 1405 (step 1500). If it is determined that Write W0 1400 would overwrite data currently in visible written 1432, the physical page offset (PPO) to data in visible written 1432 that would be overwritten by Write W0 1400 is marked in tracking structure 1420 (step 1505), the relationship between the reference of the PPO and the location on physical flash 1416 is shown by line 1406. Write W0 1400 is written to the logical space 1435 which is mapped by the tracking structure 1420 and physically written in hidden free space 1441 (step 1515) and the relationship between the reference in tracking structure 1420 and the written space is given by line 1404. A reference in tracking structure 1420 is updated to point to the data in the hidden free list 1441. The view of logical flash 1415, as represented by physical flash 1416 and tracking structure 1420, shows the data to have been overwritten in visible written 1441. Thus, in these example embodiments, the data to the original written data is maintained on flash device 1416 and tracked by a reference in tracking structure 1420 and the new data is written to the portion of the hidden free space 1441. The view of logical flash 1415 shows the data has been overwritten and the view of the physical flash 1416 and tracking structure 1420 show that the write has been stored in user hidden free space 1441 and references in the tracking structure 1420 have been updated to track both the "overwritten" and new data without losing the "overwritten" data.

Figure 16:
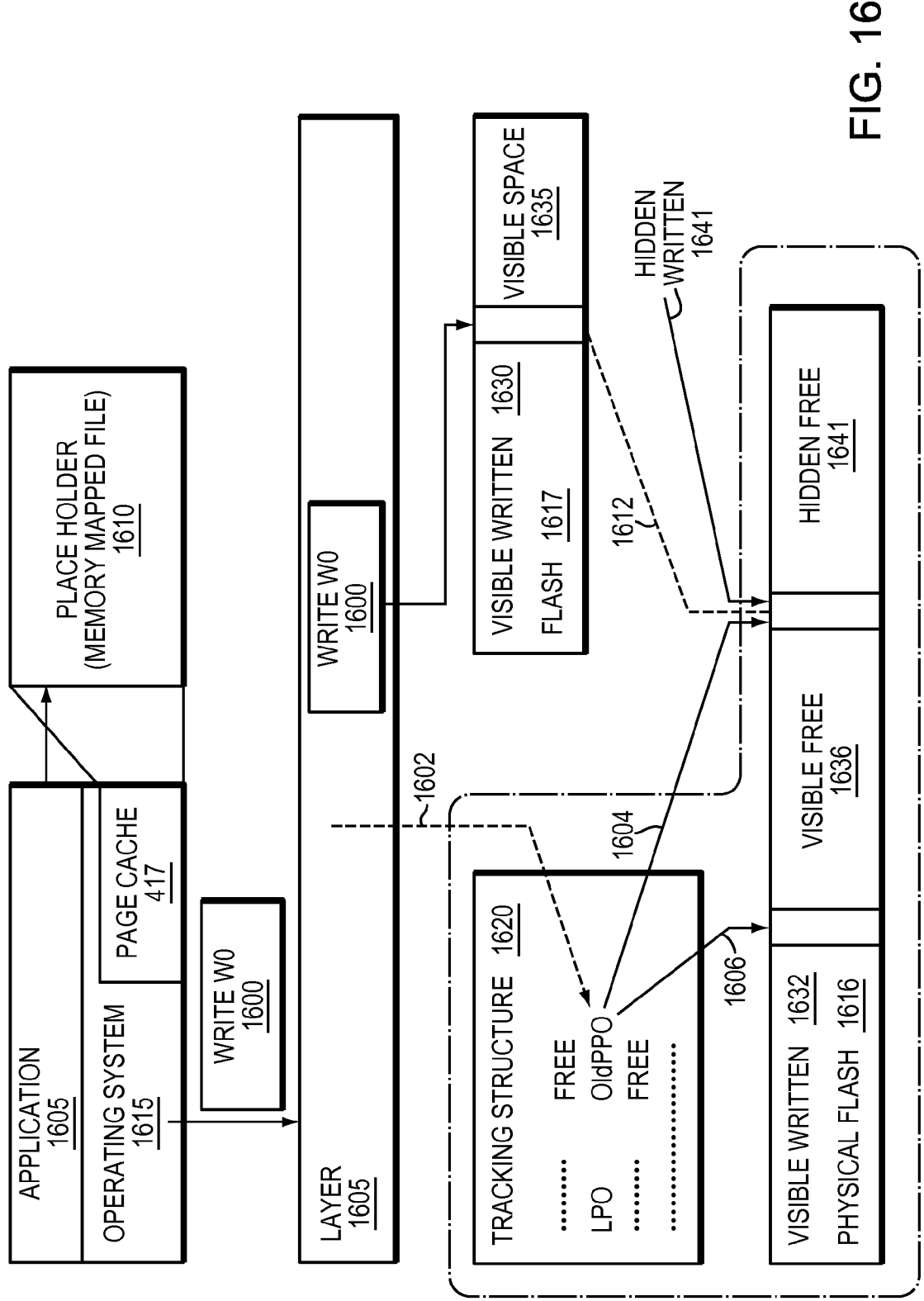
FIG. 16 is a simplified illustration of a an application performing a write and a device performing the write to a logical view of a storage medium, where both the write data and the previous data are stored using a tracking structure and a physical storage medium with visible and hidden storage space, in accordance with an embodiment of the present disclosure.

Refer now to the example embodiment of FIG. 16, which presents an alternative simplified embodiment of that of FIG. 14 including an application, operating system, and place holder. In the example embodiment of FIG. 16, Operating system 1615 sends Write W0 1600 to layer 1605. Write W0 1600 is written to the logical space 1635 which is mapped by the tracking structure 1620 and physically written to hidden free space 1641 as shown by line 1641. The location of the data associated with Write W0 1600 is added to tracking structure 1620. The location of the old data previously associated with the data which was overwritten is kept in tracking structure 1620 as shown by line 1606 and the data is not overwritten in physical flash 1616. Logical Flash 1617 presents W0 1600 as having occurred in visible space 1635 and changes the visible data in visible written 1632. However, both the new data and the old data are maintained with a reference or PPO indicating the location of the new and old data in hidden free 1641 and visible written 1632 through tracking structure 1620 in physical flash 1616.

Figure 17:
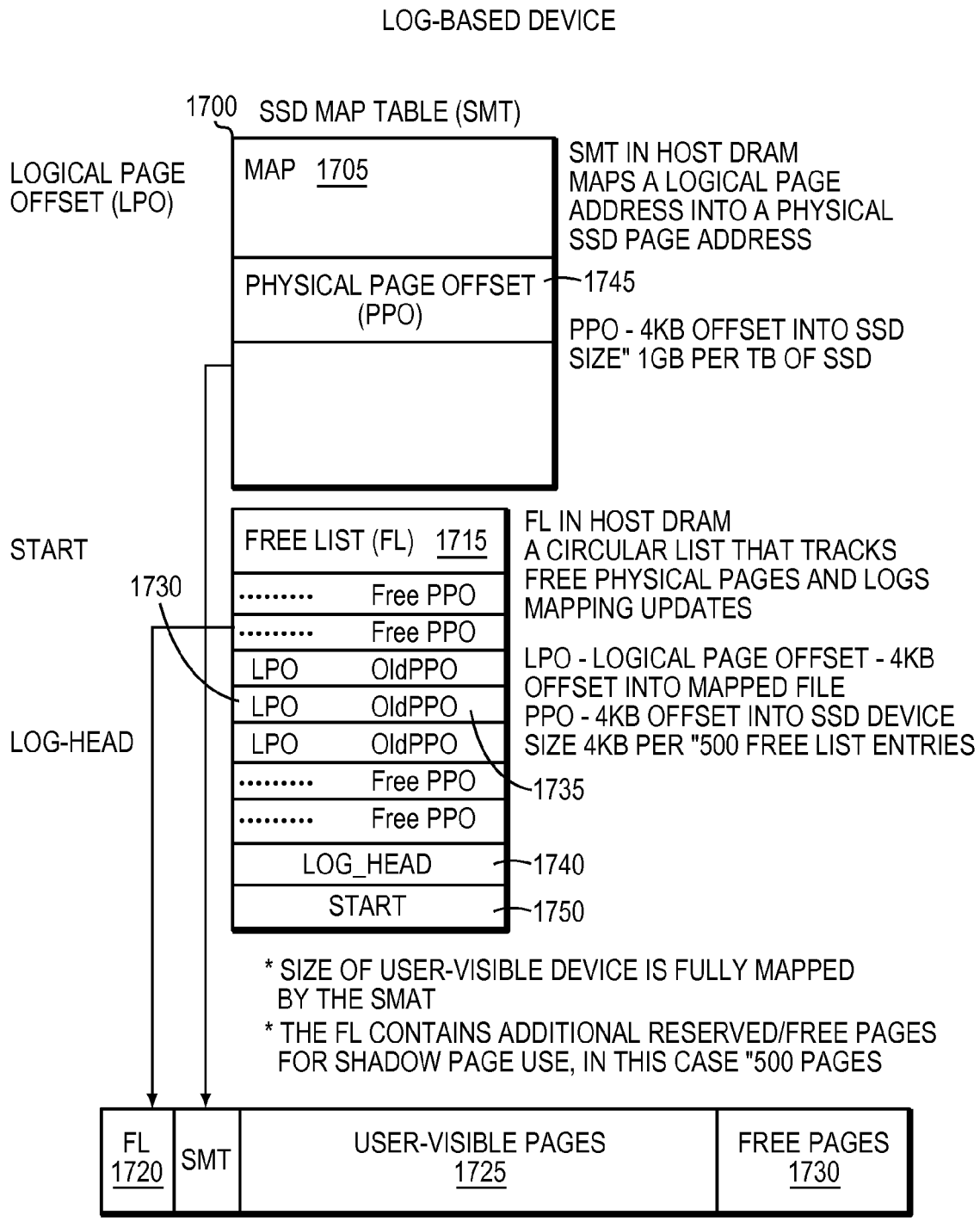
FIG. 17 is an alternative simplified illustration of a device performing write to a logical view of a storage medium, where both the write data and the previous data are stored using a tracking structure and a physical storage medium with visible and hidden storage space, in accordance with an embodiment of the present disclosure.

Refer now to the example embodiments of FIG. 17, which represent alternative embodiments of the tracking structure. SMT 1700 contains a list of maps of the Logical Page Offsets (LPOs) to Physical page offsets (PPOs) 1745 on the solid state device (SSD) 1720. This map provides the PPO to the current data referenced by an LPO. Free list 1715 has a list of LPOs and their corresponding set of old PPOs, which lists the information that that logical location previously contained, i.e. before a write and free list 1715 includes free PPOs for use with new writes. In this embodiment, an LPO is a 4 KB-aligned offset into an mmaped filed. A PPO is a 4 KB-aligned offset into the SSD device. SSD 1720 contains the free list 1715, SMT map 1700, user visible pages 1725, and free pages 1730.

Refer now as well to the embodiment of 18a, which illustrates initialization of SMT 1700 and FL 1715. SMT 1700 with a 1:1 mapping starting at $PPO_0$ for the size of the exposed or user visible pages 1725 is written (step 1800). Free list 1715 is written out containing free PPOs for the free pages 1730 (step 1805).

Figure 18A:
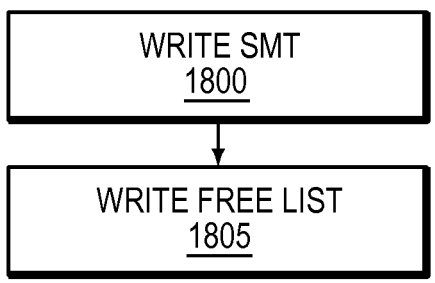
FIG. 18a is a simplified example of a method for initializing a SSD storage map table and a free list, in accordance with an embodiment of the present disclosure.
Figure 18B:
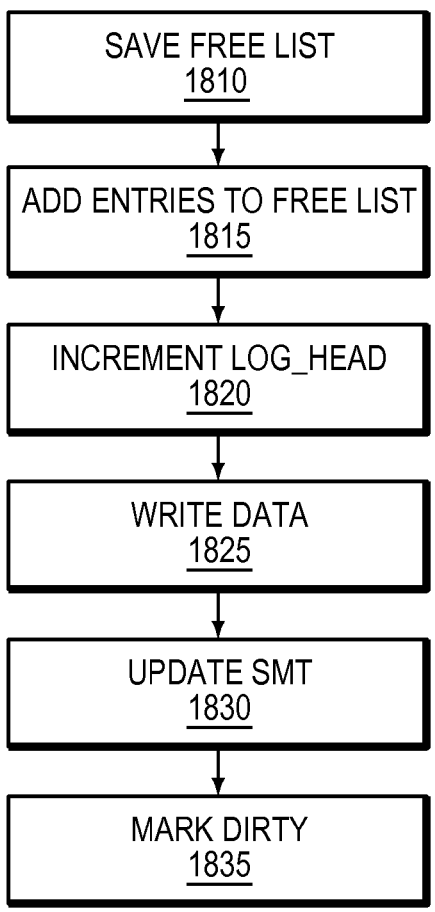
FIG. 18b is a simplified example of a method a write occurring to a logical view of flash, in accordance with an embodiment of the present disclosure.
Figure 18C:
FIG. 18c is a simplified example of a method for reading data from a logical view of flash, in accordance with an embodiment of the present disclosure.
Figure 18D:
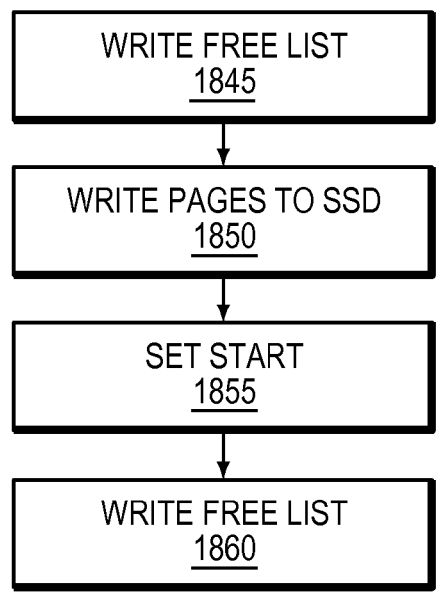
FIG. 18d is a simplified example of a method for creating a checkpoint IOCTL, in accordance with an embodiment of the present disclosure.

Refer now as well the example embodiment of FIG. 18b, which is an embodiment describing how a write may occur. Free PPO is saved from FL(log_head) 1715 (step 1810). LPO and old PPO from the SMT(LPO) 1745 are entered into the FL(Log_head) entry 1715 (step 1815) as LPO 1730 and old-PPO 1735. Log_head 1740 is incremented (step 1820). The write data is written to the SSD 1720 in the new_PPO space at free pages 1730 (Step 1825). SMT 1700 is updated to point to the new PPO in free pages 1730 (step 1830). The 4 KB page containing the SMT entry is marked as dirty (step 1835).

Refer now as well to the example embodiment of 18c, which illustrates a read. A read to SSD 1720 is serviced at the PPO 1745 from the SMT 1700 (step 1840).

Refer now as well to the embodiment of 18d, which describes creating a checkpoint ioctl. FL 1715 is written to SSD 1720 (step 1845). In alternative embodiments, if a scattered atomic write is supported this step may not be necessary. The dirty 4 KB SMT 1700 pages are written to the SSD 1720 and marked not dirty (step 1850). Start 1750 is set to be the log_head 1740 (step 1855). FL 1715 is written to the SSD 1720 (step 1860). In alternative embodiments, if a scattered atomic write is supported this step may not be necessary.

Figure 18E:
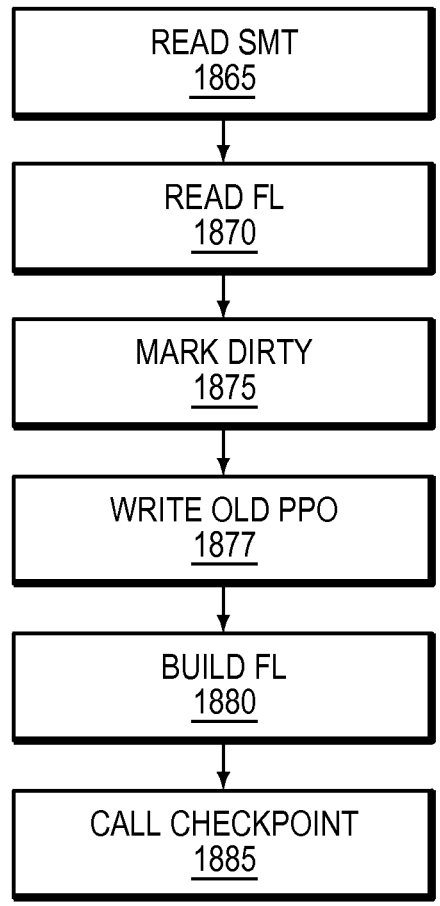
FIG. 18e is a simplified example of a method for crash recovery, in accordance with an embodiment of the present disclosure.

Refer now as well to the example embodiment of FIG. 18e, which illustrates crash recovery. SMT 1700 is read (step 1865). FL 1715 is read (step 1870). SMT 1700 entries that are in FL 1715 between the start 1750 and log_head 1740 are marked as dirty (step 1875). The old PPOs from the FL between start and log head are written back to the SMT at each of the LPOs (step 1877). In alternative embodiments, if a scattered atomic write is supported this step may not be necessary. SMT 1700 is scanned and FL 1715 is built (step 1880). The checkpoint function is called (step 1885).

The example embodiments of FIGS. 13-18 may be used in combination with the features of the example embodiments of FIGS. 2-18. For example, in some embodiments, the tracking structure and tracking method may be used to act the mechanism of the undo log such as in FIGS. 4 and 11. In other embodiments, the methods of FIGS. 18a-e may be used to roll the flash back to a check point as in FIGS. 9 and 10.

Write Changes Using Segmentation Fault Handler

In some embodiments, data written to a particular space may be protected in an operating system. In most embodiments, a write protected space may be a page of memory managed by an operating system. In certain embodiments, any write to a protected space may throw a fault within the system. In an embodiment, if a fault is unhandled, an error may occur. In other embodiments, if there is a handler for a thrown fault, then the fault may be resolved. In most embodiments, a user or system may be able to indicate what fault may be thrown by writing to a protected area. In certain embodiments, the user or system may be able to provide a fault handler to handle a thrown fault. In further embodiments, a fault handler may be similar to an error handler.

In some of the aforementioned embodiments, to facilitate a write to an undo log, a read of the old data from the flash or persistent storage may occur. In some embodiments, the pages represented in a memory mapped file space may be designated as protected. In these embodiments, a write to one of the pages may cause a segmentation fault. In certain embodiments, the segmentation fault may trigger a segmentation fault handler to respond to the segmentation fault. In at least one embodiment, the segmentation fault handler may respond to the segmentation fault or write to the protected area. In at least some embodiments, the segmentation fault handler may determine the existing data to be overwritten by the write. In most embodiments, the segmentation fault handler may send the previous information currently stored to be written to the undo log before returning to the application where the information is overwritten in the structure. In most embodiments, once the data is sent to the undo log, the data may be overwritten in the memory structure.

Figure 19:
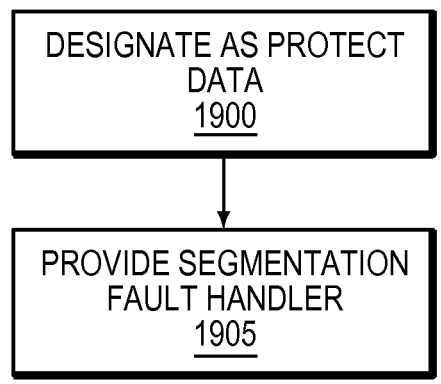
FIG. 19 is a simplified example of a method for using a fault handle for protected data, in accordance with an embodiment of the present disclosure.
Figure 20:
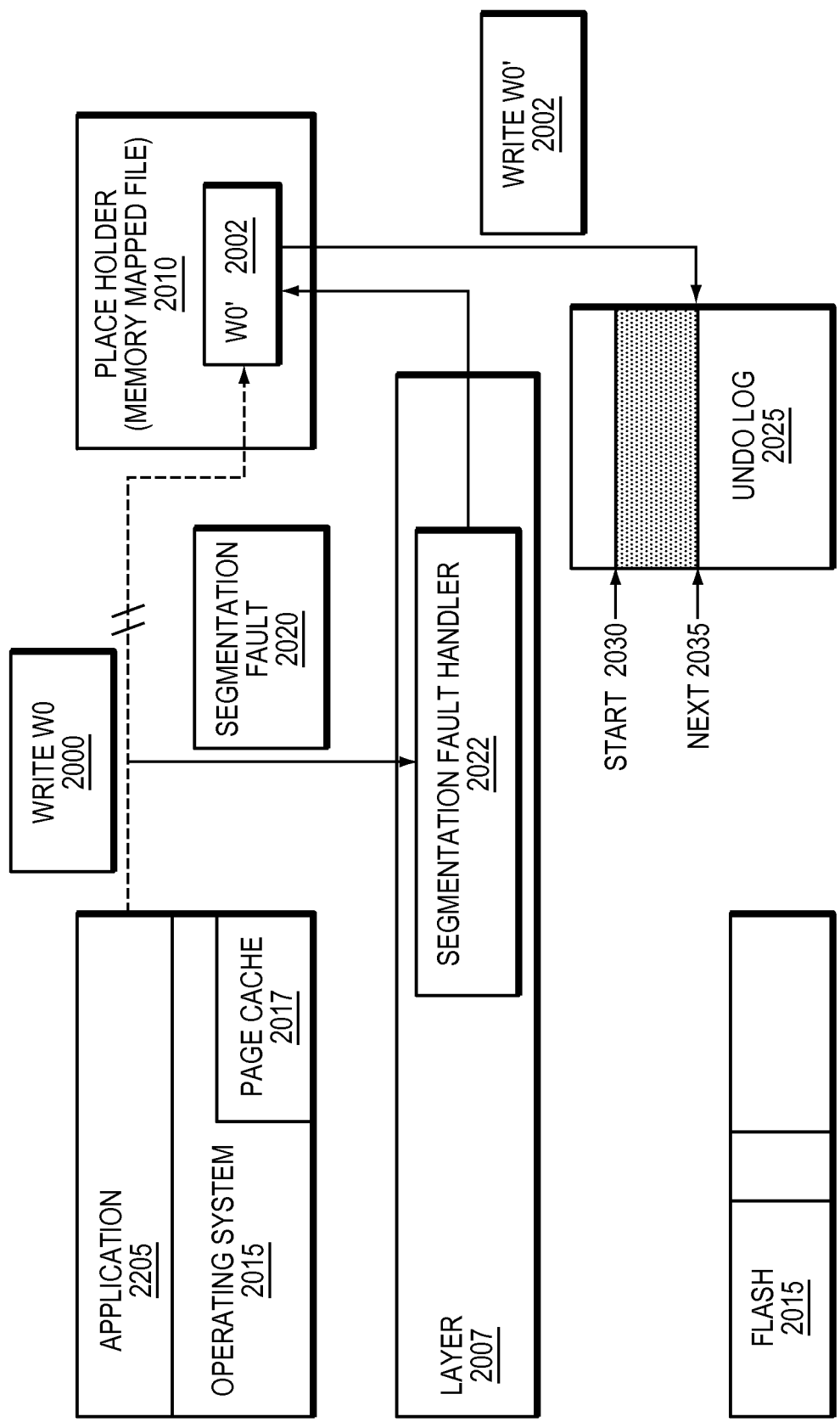
FIG. 20 is a simplified illustration of a an application triggering a fault handler by writing to protected data, in accordance with an embodiment of the present disclosure.

Refer now to the example embodiments of FIGS. 19 and 20. In these example embodiments, place holder 2010 is designated as protected data (step 1900). Any writes, such as write W0 2000 triggers a segmentation fault. Segmentation Fault Handler 2022 is provided to handle segmentation faults (step 1905).

Figure 21:
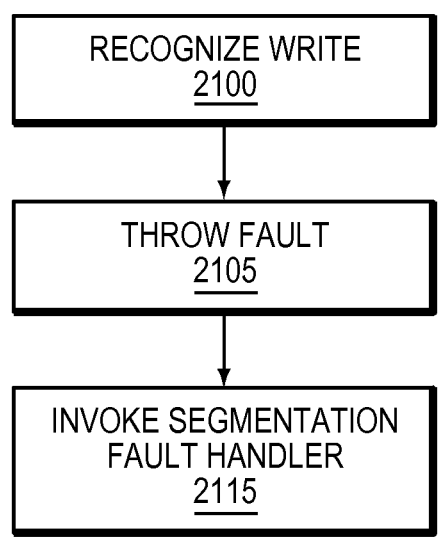
FIG. 21 is a simplified example of a method for invoking a fault handle for to handle a write to protected data, in accordance with an embodiment of the present disclosure.

Refer now to the example embodiments of FIGS. 20 and 21. In these example embodiments, W0 2000 is sent to place holder 2010, which has been designated as protected data, to overwrite data W0' 2002, which is recognized as protected data (step 2100). Write W0 2000 triggers segmentation fault 2020 (step 2015). Segmentation fault 2022 triggers a response from segmentation handler (step 2115).

Figure 22:
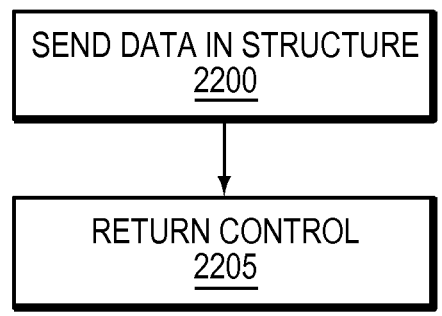
FIG. 22 is a simplified example of a method of a handling a fault, in accordance with an embodiment of the present disclosure.

Refer now as well to the example embodiment of FIG. 22. Segmentation handle 2022 responds to the segmentation fault by implementing logic responding to a write to the protected area. Segmentation fault 2020 sends W0' 2002 in placeholder 2010, which represents the old data designated to be overwritten by Write W0 2000, to undo log 2025 (step 2200).

Figure 23:
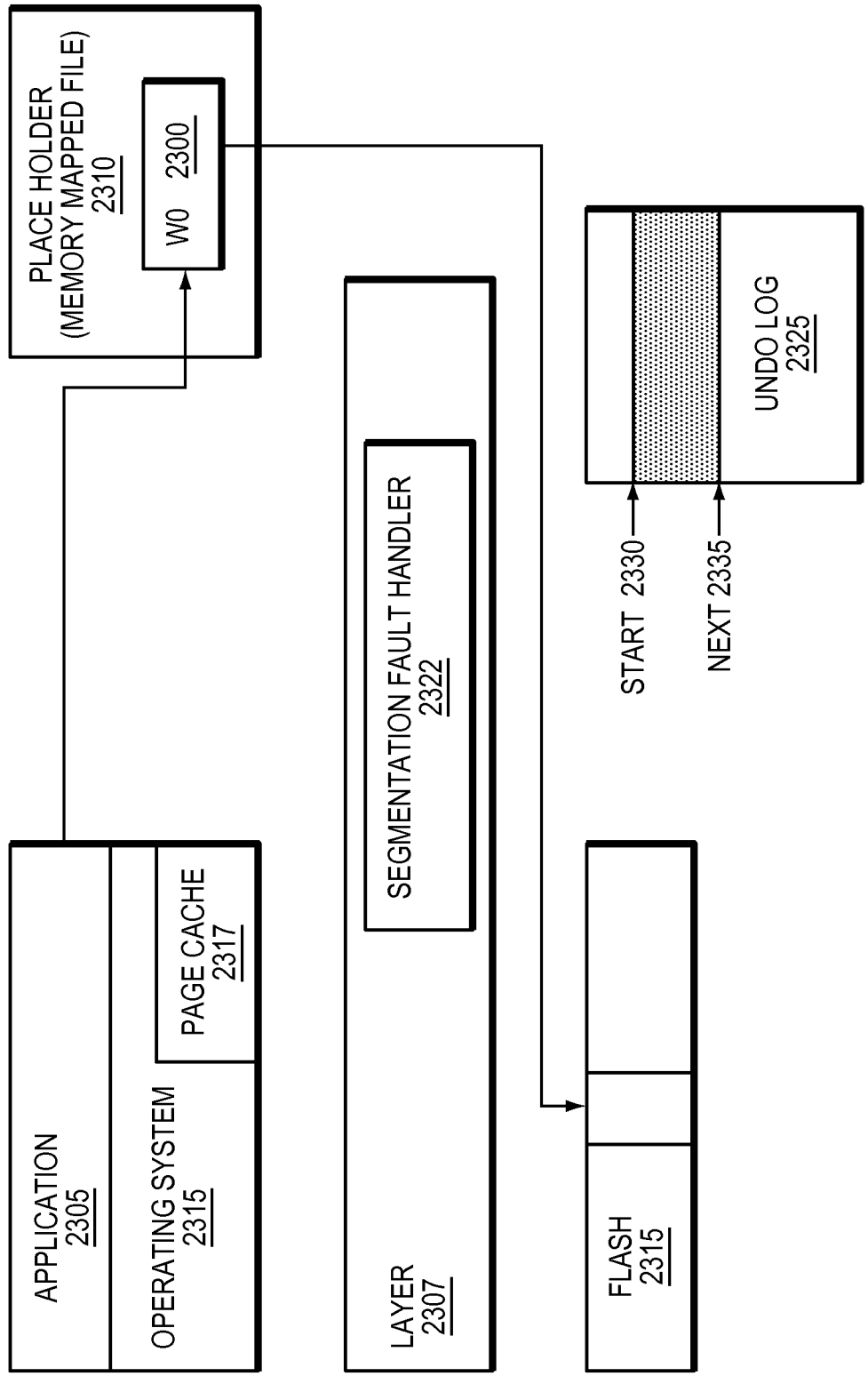
FIG. 23 is a simplified illustration of an application after return of successful handling of a fault triggering by a write to protected data, in accordance with an embodiment of the present disclosure.

Refer now as well to the example embodiment of FIG. 23. Segmentation Fault hander returns control to application which sends Write W0 2300 to place holder 2310 to overwrite the data that has been transferred to and saved in undo log 2325 (step 2205). Place holder 2310 may be stored in flash 2315 and the data placed in the undo log 2325 corresponds to the data overwritten on flash 2315. In comparison to some of the other embodiments described herein, using a segmentation fault may enable a data to be written directly from a place holder into an undo log without needing to first read the data from the flash drive.

Figure 24:
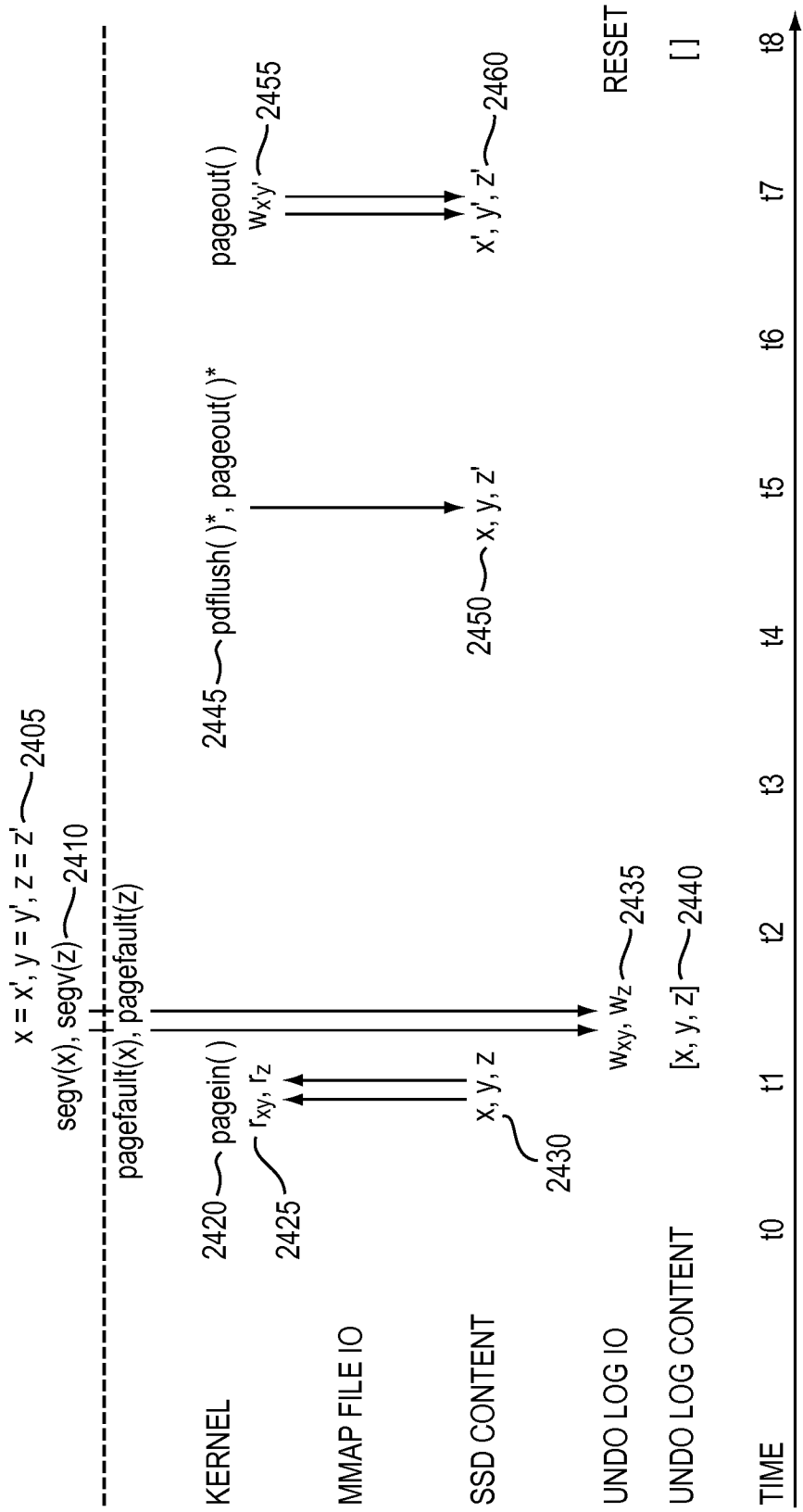
FIG. 24 is a simplified illustration of handling of a fault triggering by a write to protected data, in accordance with an embodiment of the present disclosure.

Refer now to the example embodiment of FIG. 24, which illustrates an alternative embodiment using segv. Writes occur to X, Y, and Z 2405. A page fault occurs for X and Z

2415. The content of X, Y, and Z are read from mmaped file 2425 through pagein 2420. These writes also cause a segv for X and Z 2410, which are protected write areas. This triggers X, Y, and Z to be written to the undo log 2435. Pdflush, pageout 2445 and pageout 2455 write X', Y', and Z' 2450 and 2460 out to SSD.

Figure 25:
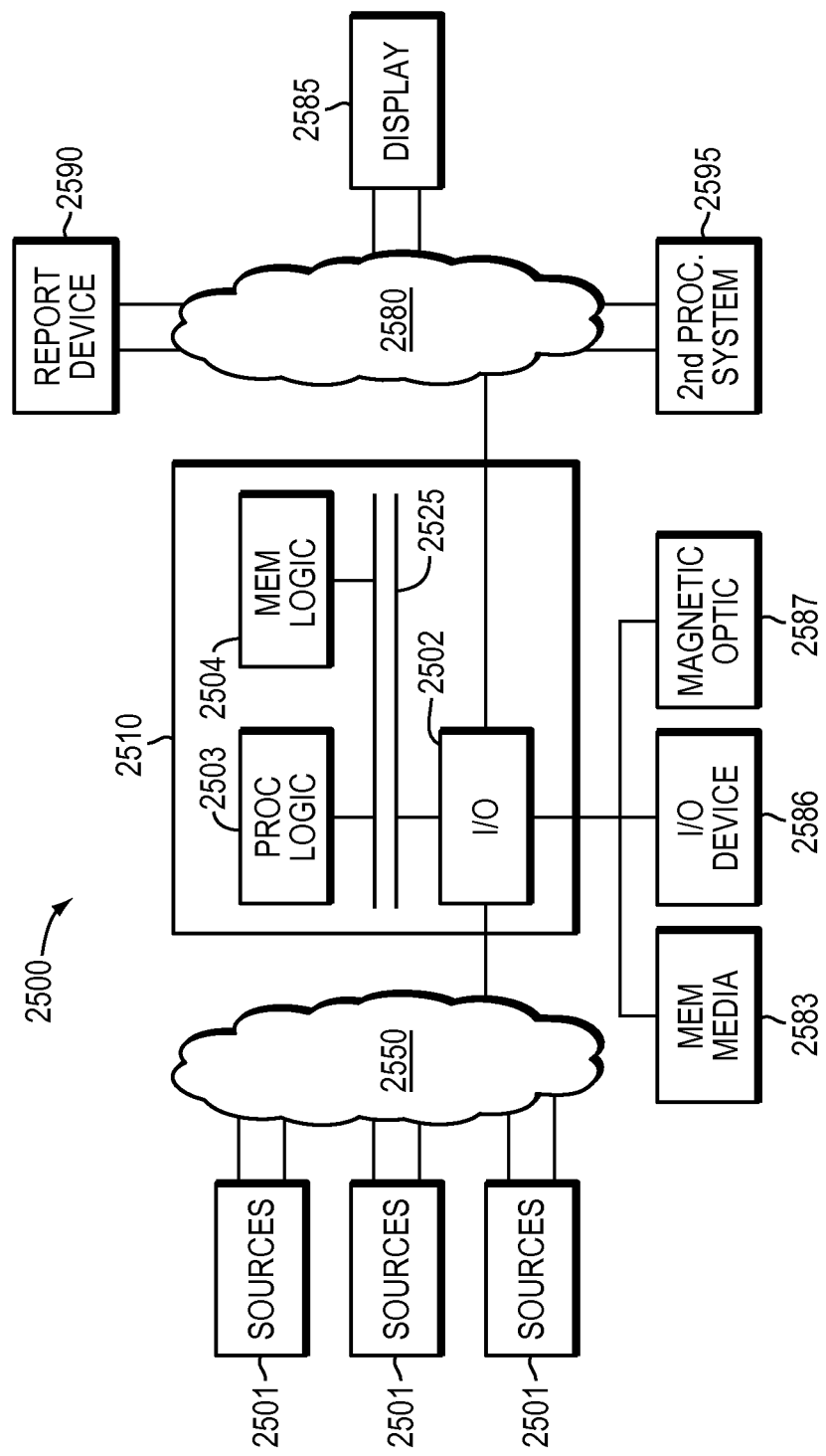
FIG. 25 is an example of an embodiment of an apparatus that may utilize the techniques described herein, in accordance with an embodiment of the present disclosure.
Figure 26:
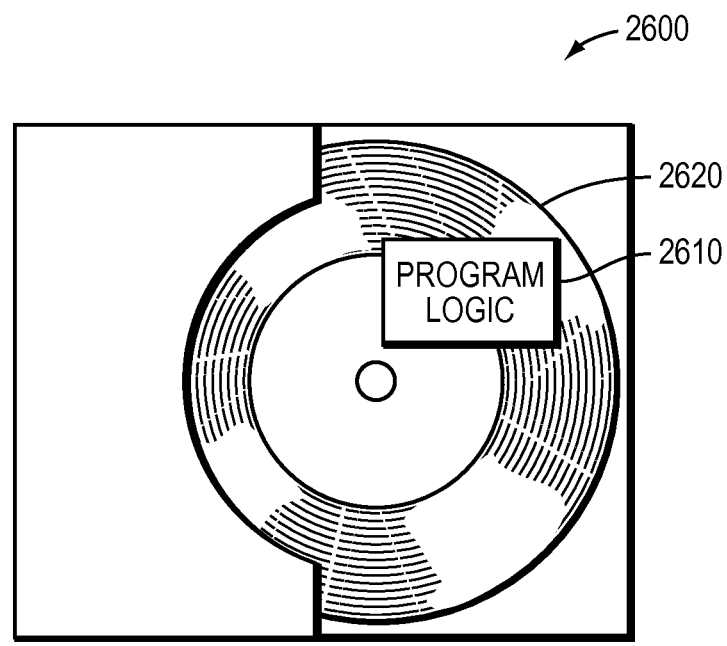
FIG. 26 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 25, the machine becomes an apparatus for practicing the invention. When implemented on one or more general-purpose processors, the program code combines with such a processor 2503 to provide a unique apparatus that operates analogously to specific logic circuits. As such a general purpose digital machine can be transformed into a special purpose digital machine. FIG. 26 shows Program Logic 2634 embodied on a computer-readable medium 2630 as shown, and wherein the Logic is encoded in computer-executable code configured for carrying out the reservation service process of this invention and thereby forming a Computer Program Product 2600. The logic 2634 may be the same logic 2540 on memory 2504 loaded on processor 2503. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIG. 5, FIG. 7 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system for data consistency, the system comprising:
    a consistency layer;
    a non-volatile storage medium;
    an undo log;
    a memory-mapped file facility;
    and
        computer-executable logic operating in memory, wherein the computer-executable program logic is configured to enable one or more processors to execute:
    establishing a memory-mapped file;
    enabling the memory-mapped file data to be paged to the non-volatile storage medium;
    marking a portion of the memory-mapped file as protected; wherein a write to the memory mapped file throws a segmentation fault;
    receiving a write at the memory mapped file;
    throwing a segmentation fault; and
    handling the segmentation fault in a segmentation handler; where the handling comprises reading the information in the memory mapped file facility into the undo log; and writing the write IO to the storage medium.

2. The system of claim 1 further comprising a server and wherein the consistency layer appears to the server to be a memory mapped file.

3. The system of claim 1 wherein the storage medium is flash.

4. The system of claim 1 wherein the write to a protected portion of the memory mapped file is from an application and wherein computer logic is further configured to enable one or more processor to execute:
    returning control to the application to perform the write TO from the segmentation handler.

5. The system of claim 1 wherein the undo log has a start location and a next location and wherein the computer logic is further configured to enable one or more processor to execute:
    moving the start and the next location in response to the dirty data being written to the undo log.

6. A computer program product for use in ensuring consistency comprising:
    a non-transitory computer readable medium encoded with computer executable program code for replication of data, the code configured to enable the execution of:
    program logic is configured to enable one or more processors to execute:
    establishing a memory-mapped file;
    enabling the memory-mapped file data to be paged to a non-volatile storage medium;
    marking a portion of the memory-mapped file as protected; wherein a write to the memory mapped file throws a segmentation fault;
    receiving a write at the memory mapped file;
    throwing a segmentation fault; and
    handling the segmentation fault in a segmentation handler; where the handling comprises reading the information in the memory mapped file facility into the undo log; and writing the write IO to the storage medium.

7. The computer program product of claim 6 wherein the consistency layer appears to a server to be a memory mapped file.

8. The computer program product of claim 6 wherein the storage medium is flash.

9. The computer program product of claim 6 wherein the write to a protected portion of the memory mapped file is from an application and wherein the code configured to enable the execution of returning control to the application to perform the write TO from the segmentation handler.

10. The computer program product of claim 7 wherein the undo log has a start location and a next location and wherein the code is further configured to enable moving the start and the next location in response to the dirty data being written to the undo log.

11. A computer implemented method for data consistency comprising;
    establishing a memory-mapped file;
    enabling the memory-mapped file data to be paged to a non-volatile storage medium;
    marking a portion of the memory-mapped file as protected; wherein a write to the memory mapped file throws a segmentation fault;
    receiving a write at the memory mapped file;
    throwing a segmentation fault; and
    handling the segmentation fault in a segmentation handler; where the handling comprises reading the information in the memory mapped file facility into the undo log; and writing the write IO to the storage medium.

12. The computer implemented method of claim 11 wherein the storage medium is flash.

13. The computer implemented method of claim 11 wherein the consistency layer appears to a server to be a memory mapped file.

14. The computer implemented method of claim 11 wherein the write to a protected portion of the memory mapped file is from an application and wherein the method further comprises returning control to the application to perform the write TO from the segmentation handler.

15. The computer implemented method of claim 11 wherein the undo log has a start location and a next location and wherein the method further comprises moving the start and the next location in response to the dirty data being written to the undo log.

* * * * *